INVENTORS
HENRY JAMES FOXON AND
ANTHONY BAGNOLD SOWTER
BY
ATTORNEY

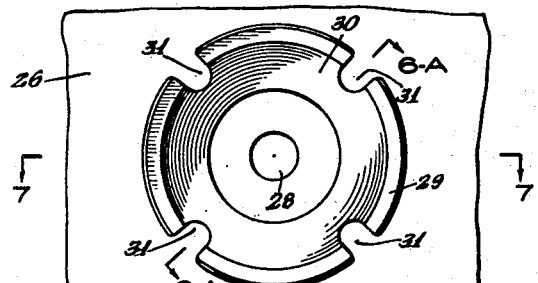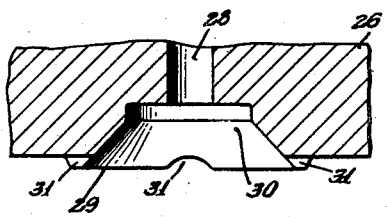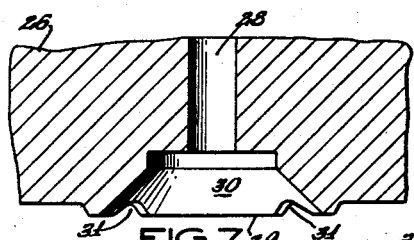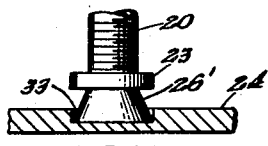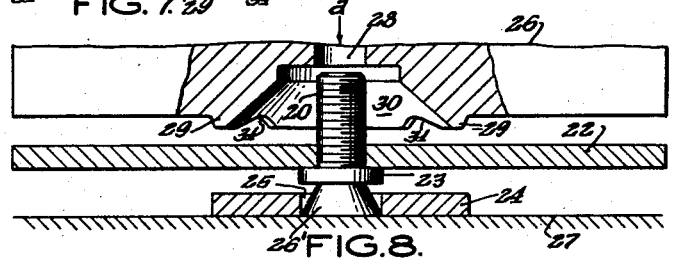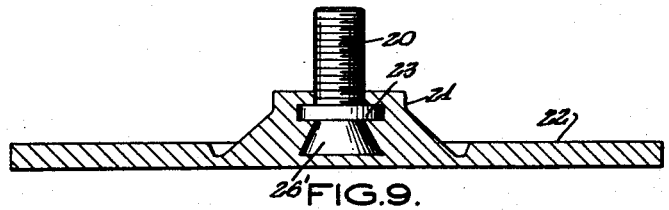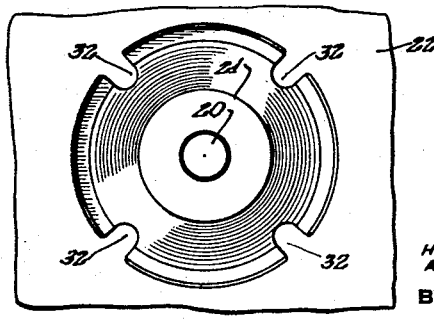

United States Patent Office 2,701,483
Patented Feb. 8, 1955

2,701,483

METHOD OF SECURING INSERTS IN DUCTILE METAL MEMBERS BY PRESSURE WELDING

Henry James Foxon and Anthony Bagnold Sowter, Middlesex, England, assignors to The General Electric Company Limited, London, England Application September 20, 1950, Serial No. 185,812

Claims priority, application Great Britain July 12, 1950

5 Claims. (Cl. 29—470.1)

The present invention relates to pressure welding such as to cold pressure welding, i. e. the welding together of a pair of metallic members of aluminum, copper or other ductile metal or metal alloy, essentially by pressure and without the supply of any substantial amount of heat to the members to be welded.

As will become evident, the invention is, however, not restricted to cold pressure welding and is also applicable to cases where some heat is applied to members to be welded, but where the welding is caused essentially by a plastic or cold flow of the metal of the contacting surfaces to be joined as a result of the applied pressure, in such a manner as to effect an intimate contact and merging of the metal streams into a solid phase welding bond or joint.

In pressure welding in general and in cold pressure welding in particular, since, as pointed out, metal must flow under the applied pressure to produce a weld, there is some reduction in thickness of the member being welded and, in some instances, the welding tool leaves a depression or indentation in the member welded to another member. Thus, where a vessel such as a cooking utensil is to be provided with a handle welded to the side of the vessel, one or more depressions are usually left on the inside or the outside of the vessel or on both inside and outside surfaces when using known methods and techniques of cold pressure welding.

Such a depression or depressions, in addition to reducing the strength of the weld, may be undesirable or disadvantageous, such as in the case of a cooking utensil, in that they may trap food which it is difficult to remove or clean out and, for this reason as well as for reasons of strength, welds of this nature are in general less suitable for this purpose than other fastening methods, such as riveting or the like. Similar disadvantages as a result of the tool depression or deformation left at or of the reduced strength of the weld exist in other uses and applications of pressure welding from both a practical and technical point of view.

An object of the present invention is generally to improve the strength of metallic members of ductile metal by a reinforcing insert of relatively harder metal applied by means of a pressure welding technique.

Another object of the invention is to substantially overcome the above-mentioned disadvantages and to provide a pressure weld or connection, in particular by means of a cold pressure welding technique which is substantially free from any undesirable indentation or projection on at least one side of the members being welded.

Still another object of the invention is to provide a method of and means for firmly connecting or securing to a member of ductile and pressure weldable metal a mounting element of comparatively harder metal by means of a pressure welding technique, to enable the joining or securing to said member of auxiliary parts such as a handle, bracket, etc., or for connecting different members together.

A more specific object of the invention is the provision of a method of and means for pressure welding which is particularly suited to the mounting or securing of handles or other parts to cooking vessels or like articles.

With the foregoing and further objects in view, as will appear hereafter, the invention involves generally a method of reinforcing a member or article of ductile metal, in particular aluminum, copper, etc. by an insert of relatively stronger metal, to provide a means for efficiently and securely attaching thereto another member or part such as a handle, bracket, etc., or in general to improve the mechanical strength and other desirable characteristics of the reinforced portion of such member.

More particularly, according to the invention, the insert or reinforcing element, which, in case of an aluminum member may consist of mild steel, is embedded in or trapped between said member and an auxiliary member in the form of a plate, disc pellet or the like and consisting of the same or any other pressure weldable metal. The auxiliary member is pressure welded to said first member in accordance with known pressure welding techniques, such as described in greater detail in United States Patent No. 2,522,408, issued September 12, 1950 by Anthony B. Sowter, joint applicant of this present application and entitled Cold Pressure Welding. The trapped or embedded insert between said members of relatively harder metal, may be completely sealed by or molded in the pressure welded members as a result of the plastic flow or keying of the metal around it during the pressure welding operation, to improve the mechanical strength of the member or to enable it to securely connect thereto other parts by riveting, clamping, etc. Alternatively, the trapped insert may be provided with a projection such as a stud or the like protruding from the welded members and serving as a fastening or mounting means for a handle, bracket or any other device to be connected thereto or for connecting a number of members together.

The welding member or pellet and the pressure welding tools are suitably designed and shaped to cause a favorable plastic flow of the metal, to both effect the pressure welding thereof and to forge or form a joint member having a desired final shape and strength and firmly enclosing or embedding said insert therein.

According to a more specific embodiment of the invention, a method of securing a stud, bolt, nut or other similar insert to a pressure weldable metal member comprises trapping a shoulder, head, flange, rib or similar projecting part on the insert between said member and a further auxiliary member also of pressure weldable metal and welded to said first member, at least one of said members being apertured to give access to or to allow passage of the projection of said insert. Thus, a head or flange on the insert may be trapped between two members pressure welded together.

More specifically, a disc or pellet forming the auxiliary member may be pressure welded at its periphery to the first member such as a vessel or the like, the disc or pellet lying over a head on the insert. This head may be simply a screw-threaded member which is unscrewed after welding to leave a tapped hole.

During welding, metal of either member is caused to flow to effect both an intimate welding bond between the members and to key into a part or parts of the insert, thus firmly locking or embedding the same between said members. Advantageously, the head on the insert may be of frusto-conical or similar irregular shape providing suitable projections, whereby the disc or pellet, being deformed during welding, keys around said head, to effect a firm and intimate enclosure by the surrounding metal.

Further objects and novel aspects of the invention will become more apparent from the following detailed description of a few practcial embodiments, considered in conjunction with the accompanying drawings forming part of this specification and in which:

Figure 6 is a bottom view of the upper tool member of a modified tool assembly for securing a stud in a metal member according to the invention;

Figure 6A is a fractional section taken on line 6A—6A of Figure 6;

Figure 7 is a section taken on line 7—7 of Figure 6;

Figure 8 is a sectional view showing the stud and members to be welded by a tool according to Figures 6 and 7, the parts being shown prior to welding;

Figure 9 is a section of the finished weld of Figure 8 obtained by means of a tool shown in Figures 6 and 7;

Figure 10 is a top view of the weld shown in Figure 9;

Figure 11 is a section similar to Figure 8 showing a modified welding member;

Like reference characters identify like parts throughout the different views of the drawings.

Figure 1:
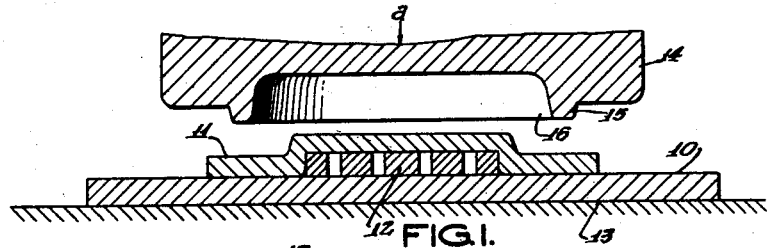
Figure 1 shows a welding tool and a section through a pair of metal members and a simple metal insert inserted therein prior to welding according to the invention.
Figure 2:
Figure 2 shows the reinforced metal member after welding.

Referring more particularly to Figures 1 and 2 of the drawings, there is shown a first member 10 which may be a portion of the wall of a container, vessel, utensil or the like consisting of aluminum, copper or any other ductile metal or metal alloy capable of being pressure welded. An auxiliary member 11 of like or different pressure weldable metal in the form of a plate, disc, ring, cap or the like is shown placed upon the member 10 after initially cleaning the areas of contact of the members, preferably by scratch-brushing, to produce metallic surfaces uncontaminated by matter foreign to the metals. Sandwiched or interposed between the members 10 and 11 is an insert of relatively harder metal such as mild steel, etc., to be trapped or firmly embedded between the members by a combined pressure welding and forging operation. The member 11 may be either flat or pre-shaped to conform to the insert 12, as shown in the drawing, in order to facilitate the welding and forging operation and to suit any given shape of the members and other conditions or requirements.

The members 10 and 11 with the insert 12 placed therebetween are placed or inserted between a pair of pressure welding tools comprising, in the example shown, a first tool member or flat anvil 13 supporting the member 10 and a cooperating tool member 14 having a pressure surface and projecting therefrom one or more welding ribs or tongues 15 and being provided with a recess 16 between said tongues. The tongues 16 may have any desired shape or configuration conforming to the shape of the member 10 and insert 11 and they may be either continuous to form a strip-like welding area or in the form of a plurality of welding tips, to produce a number of spaced spot welds, as shown and described in greater detail in the above-mentioned patent.

During welding, as the tool 14 is brought down under pressure in the direction of the arrow $a$ upon the members 10 and 11, with the tongues 15 engaging the upper surface of the member 11, the latter will be firmly welded to and in the member 10, with the upper surface of the member 11 being flush with the surface of the member 10 in the final position of the tools and with the central projection or boss 17 being formed or forged during the welding, to firmly embed the insert 12. Actually, the welding areas between the members 10 and 11 lie under the grooves or indentations 15' formed by the tongues 15 and, to a certain extent, within the boss 17. If desirable, the welding member 11, in the final welding position, may project to a certain extent from the member 10, provided a suitable design of the members and a proper pressure applied during welding, to insure an efficient pressure weld and locking or trapping of the insert.

In order to enable the attainment of an efficient weld or solid phase bond and a shaping or forging of the members by the tool 14, the metal subjected to cold or plastic flow by the applied pressure, must be allowed to escape easily and readily and without interruption of the welding process. To this end, the width of the strip-like pressure area, i. e. the width of the substantially flat-faced welding tongues 15, in the example illustrated, should be at least equal to the thickness of the members 10 and 11 or to the width of the thinner member, if the members 10 and 11 differ in thickness from each other, in order to insure optimum conditions for the metal flow during welding. The excess metal displaced in directions laterally of the welding area is forced substantially in the inward direction and up into the recess 16, thus resulting in a combined pressure welding of the members and forming or forging of the boss 17 firmly entrapping or securing the insert 12.

The insert 12 may be either a solid plate and is advantageously provided with projections, perforations, etc., in order to insure a firm hold or anchoring within the outer metal. Alternatively, the insert may be in the form of metal net, screen or the like, depending upon the desired strength and purpose for which the finished article is intended. In the example illustrated in Figure 2, the insert 12 is shown in the form of a disc provided with holes or perforations to insure a secure mounting or hold within the metal of the boss 17.

Figure 3:
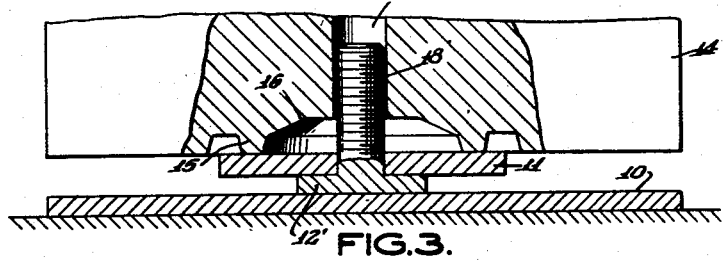
Figure 3 illustrates a modified method of securing a metal stud in a metallic member of pressure weldable metal according to the invention.
Figure 4:
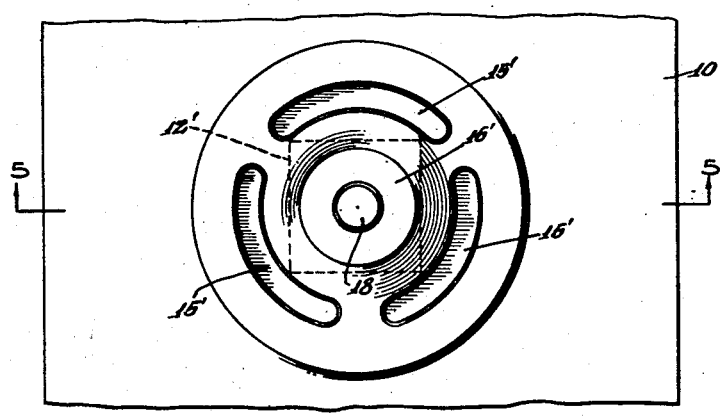
Figure 4 is a top view of the member of Figure 3 showing the member and stud after welding.
Figure 5:
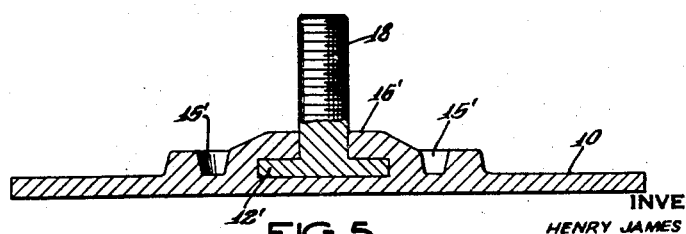
Figure 5 is a section taken on line 5—5 of Figure 4.

Figures 3 to 5 illustrate a similar arrangement for welding or embedding a threaded stud 18 between a pair of members 10 and 11, said stud having a projection such as a flange or head 12', shown in the drawing, which is inserted between the members and replaces the insert 12 of Figures 1 and 2. For this purpose, the pellet or equivalent welding member 11 is provided with a central bore 19 for passing the stud 18. Member 11 as shown has the form of a disc and the welding tongues 15 are shaped in the form of arcuate ribs suitably spaced from each other, to result in impressions or welding grooves 15', as shown in Figure 5.

Again, as the tool member 14 is brought down upon the members 10 and 11 with the stud 18 inserted in the manner shown, the outer portion of the disc 11 is at first deformed or bent around the head 12' to assume a shape similar to the member 11 as shown in Figure 1, and thereafter welding and forging of the parts into the final shape, Figure 5, will take place in substantially the same manner as described and readily understood from the foregoing.

Referring to Figures 6 to 11, there is shown a modified method of securing a threaded steel stud 20 to a wall of a cooking utensil or other member 22 which may be of wrought commercial purity aluminum, a handle or the equivalent (not shown) to be secured to the stud 20 so as to engage a hobbed or ribbed boss 21 on the outside of the member formed during welding, to prevent rotation of the handle relative to said stud. The weld obtained is such that the strength thereof along the axis of the stud 20 is at least equal to the strength of the stud itself, and, as will be clearly seen from Figure 8, the shank of the stud 20 passes from the inside of the member 22 through a fitting hole therein, a square head part 23 on the stud 20 lying up against the inside surface of the member 22.

The surface around the hole in the member 22 for a distance radially outwardly as well as the opposing surface of the pellet or welding disc 24, which traps the stud 20, are cleaned before insertion of the stud, preferably by mechanical scratch-brushing, to produce pure metallic surfaces uncontaminated by matter foreign to the metal. The disc 24 also has a central aperture 25 sufficient to clear a frusto-conical or equivalent head part 26' on the stud 20. The disc 24 may also be of commercial purity aluminum or any other suitable pressure weldable material and its thickness is preferably, though not necessarily, equal to that of the member 22. The disc 24 is shown to be circular in plan and the diameter thereof is so chosen that the resultant weld strength will be at least as strong as that of the stud 20.

As pointed out hereinbefore, the surface of the disc 24 facing the member 22 is also cleaned such as by scratch-brushing and the parts are then placed between the cooperating tools 26 and 27 shown in Figures 6 and 7. As is seen, this arrangement differs from the arrangement according to Figure 3 in that the welding disc or pellet 24 is supported by a flat anvil and welding pressure by the tool 26 is applied to the main member 22. The lower welding tool may be a flat anvil 27 as shown in the drawing and the lower side of the disc 24 and the head part 26' of the stud 20 may rest upon said anvil, as shown in Figure 8.

The upper tool 26 has a central bore 28 to receive the stud 20, and is provided with an interrupted circular welding tongue 29 presenting a pressure surface which is substantially flat in the direction of flow of the metal at welding, a central recess 30 being provided to form a boss 21 on the finished member as shown in Figure 9. The gaps 31 in the welding surface 29 serve to form upstanding keying ribs 32 on the boss 21 as shown in Figure 10.

As pointed out, the radial width of the welding surface 29 should be at least equal to but may be slightly less than the thickness of the wall 22 or the disc or pellet 24. In a practical example, if the thickness of the wall and pellet is 3/32", then the radial width of the welding surface 29 may be 1/16", the surface 29 projecting axially from the main phase of the tool 26.

If pressure is applied across the tools, metal of both the member 22 and disc 24 will be caused to flow radially outwardly beneath the surface 29, thus effecting welding of the adjacent surfaces of the disc and member over an annulus or circular strip-like area around the central axis of the stud, the radial width of the welding being about equal to the welding width of the surface 29. Metal of the pellet 24 also flows in such a fashion as to key the head part 26' of the stud 20, while metal of the wall 22 is hobbed up into the recess 30 in the tool 26 to form the boss 21. The ribs 32 serve to strengthen the connection between the main part of the member 22 and the boss 21 and although there is no weld underneath these ribs a good mechanical "stick" will be present and no leakage can occur at these points.

In effecting the welding of the members arranged as shown in Figure 8, either the anvil 27 may be held stationary and the tool 26 brought down upon the member 22, or alternatively the tool 26 may be fixed with the welding tongues 29 engaging the upper surface of the member 22 and a flat or otherwise shaped anvil 27 pressed in a direction towards the member 22 to effect welding and forging and to result in a final weld or mount as shown in Figure 9.

If a disc 24 arranged as shown in Figure 8 is used, the back face of the head part 26' of the stud 20 will be left exposed or flush with the surface of the member 22 after welding. On the other hand, if a disc 24 as shown in Figure 11 is used, i. e. with the head 26' of the stud 20 fitting a recess in the disc, the head part 26' of the stud, after welding, will be completely covered by the outer metal as shown in Figure 9. The depth of the recess 33 in the disc 24 according to Figure 11 controls the height of the boss 21 above the head part 23, in such a manner that the deeper the recess the greater said height.

Figure 12:
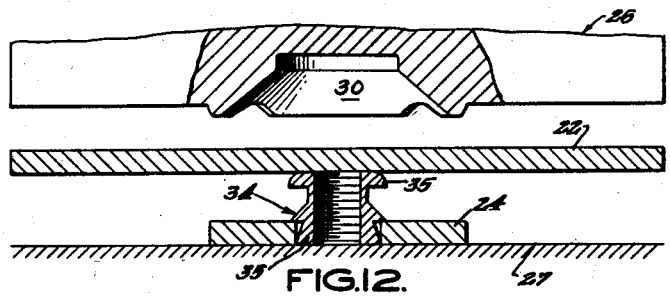
Figures 12 to 14 show a way of securing or enclosing a tapped steel insert in a member of pressure weldable metal, Figure 12 being a section showing the parts before welding and Figure 13 being a section of and Figure 14 being a top plan view of the member after welding.
Figure 13:
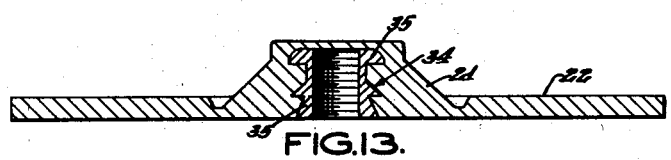
Figure 14:
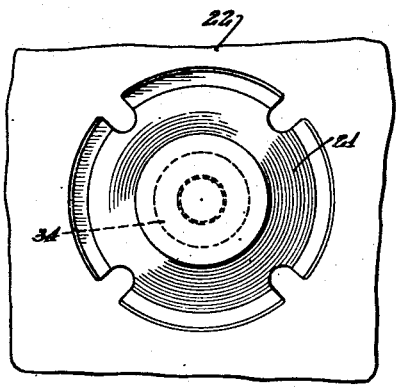

In the welding arrangement described in the foregoing, the stud projects from that side of the member 22 opposite from the auxiliary member welded thereto. Alternatively, as shown in Figures 12 to 14, the first or main member may be left solid and the second or auxiliary member provided with an aperture for receiving the metal insert. In the example shown, a threaded mild steel insert 34 is provided with three angular projections or flanges 35, the bottom two of which have frusto-conical surfaces while the top one has generally a part spherical surface. A pellet or disc 24 as before is used and this is welded, in substantially the same manner as described hereinabove to the plate or wall 22, by using welding tools of substantially the same type as shown in Figures 6 and 7, respectively.

Figures 12 to 14 differ from the arrangement of Figures 3 to 5 that in the latter the main member is supported by a smooth or flat anvil, while in the latter case the auxiliary welding member is supported by the anvil and the actual welding tool operates upon the auxiliary member in the first case and upon the main member in the second case, respectively.

After welding, as shown more clearly in Figure 13, the insert will be firmly keyed into the walls 22 and 24 and the metal of the boss 21 completely covers the upper end of the insert 34. The only important change for the tools of this weld consists in the omission in the upper tool member 26 of the central bore 28, as shown in Figures 6 and 7.

On the other hand, if it is desired to have the upper end of the insert 34, Figure 13, to be flush with the boss 21, with the lower end completely embedded in the metal, for attaching a handle or the like to the boss 21, the member 24 is provided with a recess 33 to receive the lower end of the insert, as shown in Figure 11, and so designed that the displaced metal forced into the recess 30 of the tool 26 is just sufficient to produce an upper surface for the boss 21 substantially in line or flush with the upper end of the insert 34. In this case, the insert 34 is preferably turned around, i. e. to a position differing by 180° from the position shown in Figures 12 and 13, to provide maximum tensile strength by the projection 34 in the direction away from the boss 21. If the displaced metal covers the insert 34 to some extent, as shown in Figure 13, the excess metal may be removed by filing, grinding or in any other suitable manner, as will be readily understood.

Figure 15:
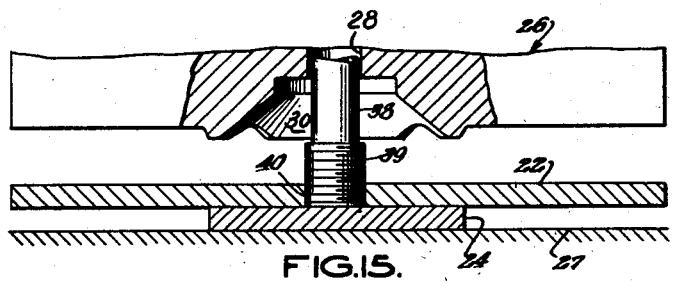
Figures 15 to 17 show a method of producing a boss on a member provided with a tapped hole, Figure 15 showing a section of the parts before welding and Figure 16 being a section of and Figure 17 being a plan view of the member after welding.
Figure 16:
Figure 17:
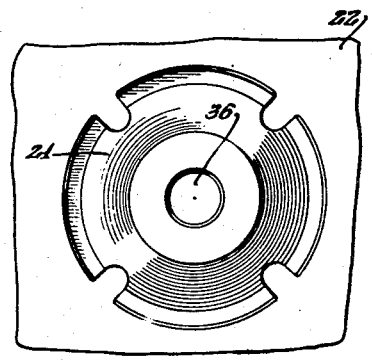

In the welding arrangement shown in Figures 15 to 17, the boss 21 in the finished member is provided with a tapped hole 36. This is obtained by inserting a rod 38 having a threaded end 39 through an aperture 40 in the plate 22 to engage the disc or pellet 24. This rod remains in place during welding, the upper welding tool being again similar to that shown in Figure 7 and the rod 38 engaging the central bore 28 of the tool 26 and with the end 39 lying within the recess 30. After welding is completed and the upper tool removed, the rod 38 may be unscrewed from the boss 21 to leave a tapped hole 36, in a manner shown in Figures 16 and 17 and readily understood.

There is thus provided by the invention a quick and simple process for producing in non-ferrous or ductile metal, in particular aluminum, the equivalent of plastic moldings or inserts of relatively harder metal, substantially without the application of external heat or electric current. More particularly, ferrous metal parts such as studs, screws or other inserts of any shape or configuration including sheets, nets, wires, etc., may be securely embedded or mounted in a non-ferrous pressure weldable metal member or part, for reinforcing or strengthening the non-ferrous member, to provide a means for securely mounting thereto other parts or members, or for any other purpose, where increased mechanical strength is required. Similarly, different types of metal inserts or parts can be mounted between dissimilar metals.

Tests made with a standard 10-32 threaded steel stud fixed to aluminum sheet of 3/32" thickness in the manner shown in Figure 9, using tensions up to 1500 lbs. have shown that the stud broke outside the weld and, although the welded joint was distorted, it did not break and remained air-tight and moisture-proof. More particularly, it was found that the welded joint was not distorted until tensions of 1000 lbs. were reached. These tests furthermore showed that such a cold welded joint will withstand more than three times the tension required to produce the same distortion in a standard stud weld or rivet. The increased strength is a result of the pressure applied in forming the cold welded joint. Beyond 1000 lbs. load, the distortion was further increased without however breaking the cold welded joint and the stud broke at more than 1500 lbs. The stud thus has a strength equivalent to that of many rivets, so that handles and other parts may be attached to utensils or any other device by a single stud taking the place of a number of rivets.

Furthermore, tests made with an aluminum threaded boss formed in parent metal of 3/32" thickness with a hobbed 1/4" standard thread, as shown in Figure 16, has shown that this joint withstands a tension of more than 1000 lbs. before the threads gave way. Although the distortion of the joint starts at lower loads, the tests show that this joint which does not employ any inserts is satisfactory for many commercial applications in connection with utensils and similar devices.

In the case of a threaded insert as shown in Figure 13 tests have shown that, on account of the construction of the units with the lateral flanges 35, no distortion of the sheet took place, while the threads gave way at a load above 1100 lbs.

In the foregoing, the invention has been described with reference to a few illustrative devices. It will be apparent, however, that variations and modifications, as well as the substitution of equivalent arrangements and steps for those shown herein, may be made without departing from the broader spirit and scope of the invention as set forth in the appended claims. The specification and drawings are accordingly to be regarded in an illustrative rather than in a limiting sense.

We claim:

1. A method of securing an element to a pressure weldable metal member, said element having an irregularly shaped end capable of becoming firmly anchored when embedded in surrounding metal, comprising cleaning the surface of said member, cleaning the surface of another member also of pressure weldable material and, with the cleaned surfaces contacting, applying to a strip-like area of said members encircling the end of said element a pressure sufficient to substantially reduce the combined cross-section thereof, to effect a pressure weld and simultaneously therewith create a flow of the metal displaced at the welding area and of the metal between said area and said element around said element, to form an encircling mount therefor.

2. A method of securing an element to a pressure weldable metal member, said element having an irregularly shaped end capable of becoming firmly anchored when embedded in surrounding metal, comprising cleaning the surface of said member, cleaning the surface of another member also of pressure weldable material and of relatively smaller size than said first member, supporting said second member and, with the cleaned surfaces of the members in facing relation and with the end of said element in between said surfaces, applying to a strip-like welding area of said first member encircling the end of said element a pressure to bring said surfaces together and sufficient to substantially reduce the combined cross-section of said members, to effect a pressure weld at said area and simultaneously therewith create a flow of the metal displaced at the welding area and of the metal between said area and said element and around the end thereof, to form an encircling mount therefor.

3. A method of securing a headed element to a pressure weldable metal member comprising cleaning the surface of said member, cleaning the surface of another member also of pressure weldable material and of relatively smaller size than and of equal thickness to said first member, supporting said second member and, with the cleaned surfaces of said members in facing relation and with the head of said element in between said surfaces, applying to an interrupted ring-shaped welding area of said first member encircling the head a pressure to bring said surfaces together and sufficient to substantially reduce the combined cross-section of said members, to effect a pressure weld at said area and simultaneously therewith create a flow of the metal displaced at said area and of the metal between said area and said element and around said head, to form an encircling mount therefor.

4. A method of securing an element having a head and an adjacent flange to an apertured plate of pressure weldable metal comprising cleaning the surface of said plate, cleaning the surface of an apertured disc also of pressure weldable material, supporting said disc, placing the head in the aperture of said disc and placing the plate over said element on the opposite side of said flange with the cleaned surfaces of said disc and plate being in facing relation, applying to a circular strip-like welding area upon said plate and concentric with said disc a pressure sufficient to substantially reduce the combined cross-section thereof, and continuing and extending the pressure application to areas beyond the outer periphery of said area, to effect a pressure weld at said strip-like area while embedding said disc in said plate, to thereby create a flow of the metal displaced at said area and of the metal between said area and said element and around said head and flange, to form an encircling mount therefor.

5. Method in accordance with claim 1 in which the end of said element is a screw-threaded enlargement and the further step of unscrewing said element from its mount so formed.

References Cited in the file of this patent

UNITED STATES PATENTS

| | | |
|---|---|---|
| 487,283 | Little | Dec. 6, 1892 |
| 756,141 | Renner | Mar. 29, 1904 |
| 1,482,818 | Shipman | Feb. 5, 1924 |
| 1,604,531 | Murray | Oct. 26, 1926 |
| 2,167,285 | Smith | July 25, 1939 |
| 2,171,323 | Wyland | Aug. 29, 1939 |
| 2,394,720 | Scrantom | Feb. 12, 1946 |
| 2,432,631 | Rosendale | Dec. 16, 1947 |
| 2,522,408 | Sowter | Sept. 12, 1950 |

FOREIGN PATENTS

| | | |
|---|---|---|
| 284,808 | Germany | June 7, 1915 |
| 566,463 | Great Britain | Jan. 1, 1945 |

OTHER REFERENCES

Metal Industry, pages 219 to 222, 227, September 12, 1947; pages 417 to 418, May 21, 1948.